US012624837B2

(12) United States Patent
Rivero et al.

(10) Patent No.: US 12,624,837 B2
(45) Date of Patent: May 12, 2026

(54) FLEXIBLE FLANGE DESIGN

(71) Applicant: RTX Corporation, Farmington, CT (US)

(72) Inventors: Pedro Rivero, Miami, FL (US); William Blickenstaff, III, Port Saint Lucie, FL (US); Peter Milligan, Gray, ME (US); Angela Reisch, South Portland, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/898,024

(22) Filed: Sep. 26, 2024

(65) Prior Publication Data

US 2026/0085839 A1 Mar. 26, 2026

(51) Int. Cl.
*F23R 3/60* (2006.01)

(52) U.S. Cl.
CPC .......... *F23R 3/60* (2013.01); *F05D 2230/642* (2013.01); *F23R 2900/00005* (2013.01)

(58) Field of Classification Search
CPC .... F01D 25/243; F05D 2230/642; F23R 3/60; F23R 2900/00005
See application file for complete search history.

(56) References Cited

U.S. PATENT DOCUMENTS

| | | | | |
|---|---|---|---|---|
| 7,661,273 | B2 * | 2/2010 | Commaret | F23R 3/283 415/209.2 |
| 9,139,306 | B2 * | 9/2015 | Porte | F01D 25/243 |
| 10,054,007 | B2 * | 8/2018 | Todorovic | F02C 7/28 |
| 12,152,777 | B2 * | 11/2024 | Ganiger | F23R 3/50 |
| 2013/0032669 | A1 | 2/2013 | Porte et al. | |
| 2015/0143816 | A1 | 5/2015 | Salunkhe et al. | |
| 2015/0226121 | A1 | 8/2015 | Cohin et al. | |

FOREIGN PATENT DOCUMENTS

| | | | | |
|---|---|---|---|---|
| EP | 2884057 | A1 | 6/2015 | |
| EP | 3591177 | A1 | 1/2020 | |
| EP | 3760835 | A1 | 1/2021 | |
| GB | 2415229 | A * | 12/2005 | F02C 7/20 |

OTHER PUBLICATIONS

Extended European Search Report for EP Application No. 25191558.3, dated Jan. 7, 2026, 10 pages,.

* cited by examiner

*Primary Examiner* — Stephanie Sebasco Cheng
(74) *Attorney, Agent, or Firm* — Kinney & Lange, P.A.

(57) ABSTRACT

An annular flexible flange is provided for connecting components of a gas turbine engine having different rates of thermal response to transient thermal events. The annular flexible flange is disposed about an axis and extends radially from an annular body. The annular flexible flange includes a plurality of fastener flanges spaced circumferentially about the flexible flange and a plurality of flexible arms connected to the annular body and connected to the plurality of fastener flanges. The plurality of flexible arms are configured to flex in a radial direction. The plurality of fastener flanges are separated from the annular body by a gap.

16 Claims, 4 Drawing Sheets

FLEXIBLE FLANGE DESIGN

STATEMENT OF GOVERNMENT INTEREST

This invention was made with government support under Contract Nos. N00019-21-G-0005; N00019-23-F-0019 awarded by the United States Navy. The government has certain rights in the invention.

BACKGROUND

The present disclosure is directed generally to joints between annular components of a gas turbine engine and, more particularly, to a bolted flange joint between components that exhibit different thermal response during transient events.

Low mass or thin components, such as an inner combustor shell or inner burner liner (IBL), are commonly bolted to a large mass component, such as a tangential on-board injector (TOBI). In such arrangements, differences in mass drive different thermal responses from each component during transient events, such as acceleration or deceleration, causing relatively low mass components to heat up at a much faster rate than larger mass components. During a transient event, a hot lower mass component thermally expands, which can cause high stress due to thermal growth mismatch at a flange joint between the two components.

Prior art bolted flange designs for inner combustor shells include a direct radial connection between the bolted joint and the inner combustor shell. The direct radial connection is not sufficiently radially compliant to account for the transient thermal growth difference between the inner combustor shell and the large mass component. As a result, there is significant load that is reacted out by the bolt, which can cause bolt failure. The radial flange at the bolted joint also slides against the large mass component with thermal growth and contraction, which can result in significant wear at an interface.

SUMMARY

An annular flexible flange is provided for connecting components of a gas turbine engine having different rates of thermal response to transient thermal events. The annular flexible flange is disposed about an axis and extends radially from an annular body and incudes a plurality of fastener flanges spaced circumferentially about the flexible flange and a plurality of flexible arms configured to flex in a radial direction. The plurality of fastener flanges are separated from the annular body by a radial gap. The plurality of flexible arms are connected to the annular body and connected to the plurality of fastener flanges.

An inner combustor shell of a gas turbine engine is configured to be connected to a component having a comparatively slower thermal response to a transient thermal event and includes an annular body defining a combustion chamber and an annular flexible flange extending radially from an annular body. The inner combustor shell is disposed about an axis. The annular flexible flange includes a plurality of fastener flanges spaced circumferentially about the flexible flange and a plurality of flexible arms configured to flex in a radial direction. The plurality of fastener flanges are separated from the annular body by a radial gap. The plurality of flexible arms are connected to the annular body and connected to the plurality of fastener flanges.

The present summary is provided only by way of example, and not limitation. Other aspects of the present disclosure will be appreciated in view of the entirety of the present disclosure, including the entire text, claims and accompanying figures.

Figure 1:
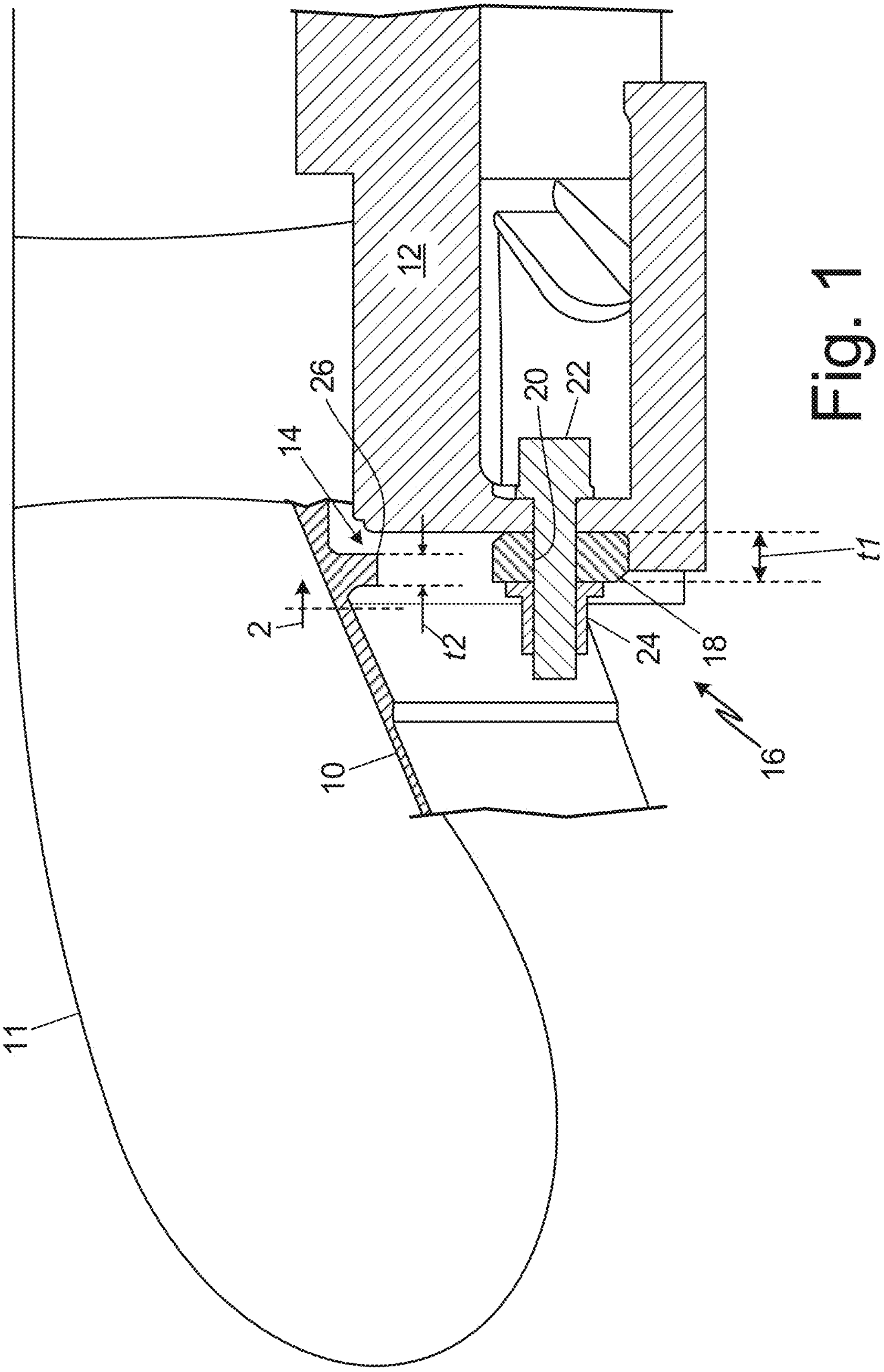
FIG. 1 is a cross-sectional view illustrating a connection between an inner combustor shell and TOBI.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The disclosed flexible flanges are configured to reduce wear and joint stress between joined components of a gas turbine engine having different thermal growth response rates during transient events, such as acceleration and deceleration, in which the components are subject to thermal changes. Specifically, the disclosed flexible flanges are configured for joining a low mass component to a large mass component. More specifically, the disclosed flexible flanges are configured for joining an inner combustor shell or IBL to a large mass component, including but not limited to a TOBI. The disclosed flexible flanges reduce a radial stiffness connection between a flange joint and the inner combustor shell thereby reducing the load on the fastener (i.e., bolt) and wear on the flange joint due to thermal growth mismatch. The disclosed flexible flanges have the compliance needed to accommodate transient events while providing the stiffness needed to accommodate surge events, during which reverse fluid flow pushes the flexible flange forward.

As used herein, the terms "low mass" and "large mass" generally refer to components that are comparatively thinner and bulkier/thicker, respectively. For example, an inner combustor shell may have a thickness equal to about $1/50^{th}$ of a thickness of a TOBI (e.g., 1 mm thickness measured in a radial direction compared to 50 mm thickness measured in a radial direction). More specifically, the terms "low mass" and "large mass" are used to describe components that have different rates of thermal response (i.e., heat up/cool down faster and heat up/cool down slower, respectively) such that there is a mismatch in thermal expansion and/or contraction. For example, an inner combustor shell may heat or cool at a rate of about 50 degrees/sec compared to about 20 degrees/sec for a TOBI. While the present disclosure is directed to a flexible flange of an inner combustor shell, it will be understood by one of ordinary skill in the art that the disclosed flexible flange can be provided on other components of a gas turbine engine to accommodate thermal growth mismatch during transient events.

Figure 2:
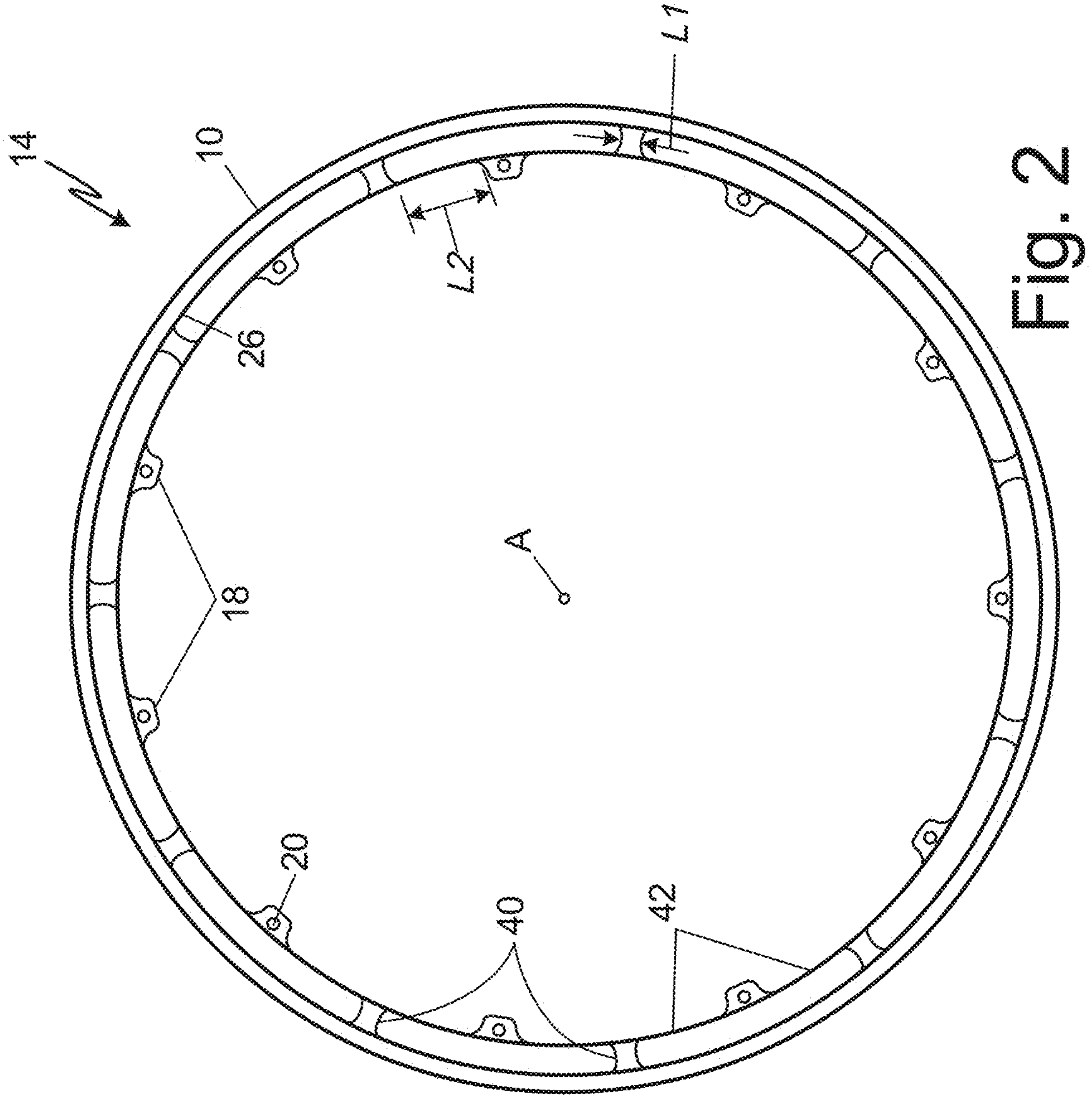
FIG. 2 is a front view of a flexible flange of the inner combustor shell of FIG. 1.
Figure 3:
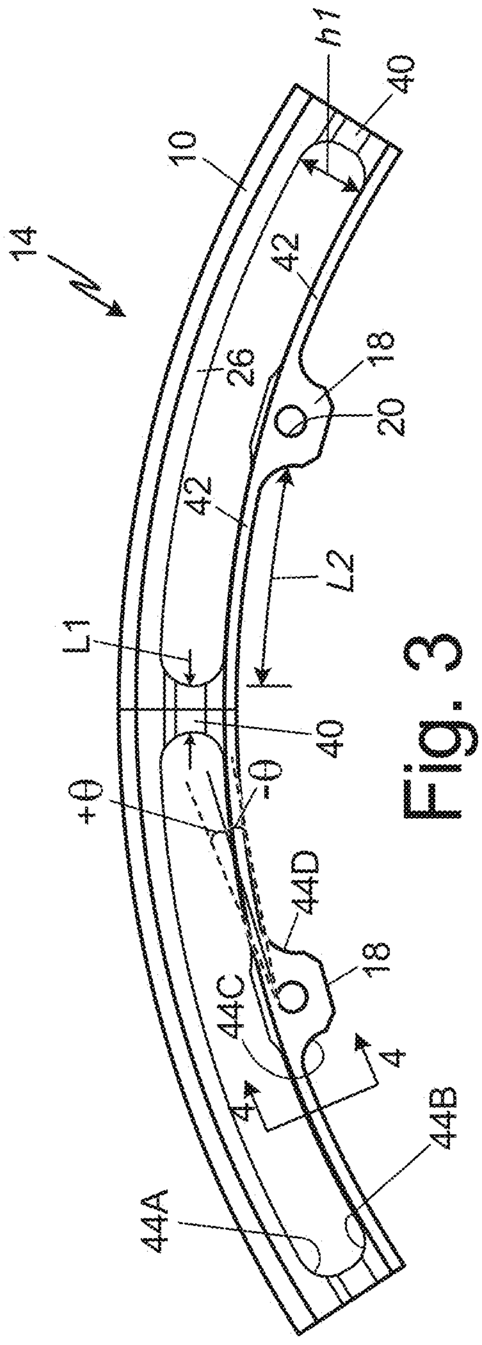
FIG. 3 is an enlarged view of a portion of the flexible flange of FIG. 2.
Figure 4:
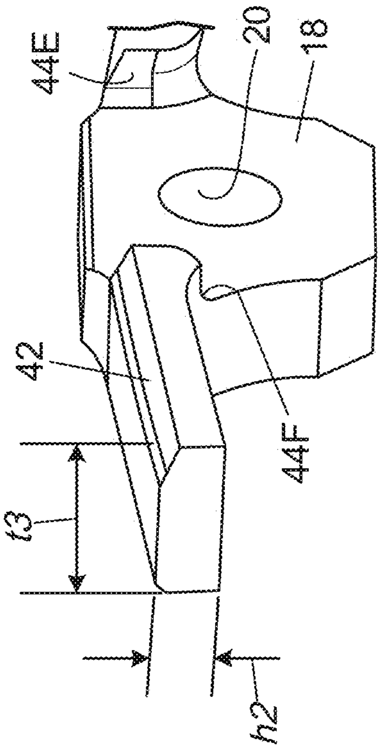
FIG. 4 is a cross-sectional perspective view of a portion of the flexible flange of FIGS. 2 and 3, taken along the 4-4 line of FIG. 3.

FIG. 1 is a cross-sectional view illustrating a connection between inner combustor shell 10 and TOBI 12. FIG. 1 shows inner combustor shell 10, combustor 11, TOBI 12, flexible flange 14, flange joint 16, fastener flange 18, hole 20, fastener 22, retaining nut 24, outer rail 26, and thicknesses t1 and t2. Combustor 11 is shown schematically to illustrate a position of combustor shell 10 in a gas turbine engine. FIG. 2 is a front view of flexible flange 14 of inner combustor shell 10 taken through cut line 2 of FIG. 1. FIG. 2 shows a portion of inner combustor shell 10, fastener flanges 18, holes 20, outer rail 26, radial connection members 40, flexible arms 42, axis A, and lengths L1 and L2. FIG. 3 is an enlarged view of a portion of flexible flange 14. FIG. 3 shows a portion of inner combustor shell 10, fastener flanges 18, holes 20, outer rail 26, radial connection members 40, flexible arms 42, fillets 44A-44D, angles +θ/−θ, lengths L1 and L2, and height h1. FIG. 4 is a cross-sectional perspective view of a portion flexible flange 14, taken along the 4-4 line of FIG. 3. FIG. 4 shows fastener flange 18, hole 20, flexible arm 42, height h2, and thickness t3. FIGS. 1-4 are discussed together herein.

Inner combustor shell 10 includes flexible flange 14. Flexible flange 14 includes fastener flange 18 with hole 20, outer rail 26, radial connection members 40, and flexible arms 42. In some embodiments, outer rail 26 may be omitted. Flange joint 16 can connect inner combustor shell 10 to TOBI 12 via fastener flange 18, fastener 22, and retaining nut 24. Fasteners 22 can be, for example, bolts.

FIG. 1 shows a portion of a hot section of a gas turbine engine in which inner combustor shell 10 is connected to TOBI 12. In other embodiments, inner combustor shell 10 can be connected to other large mass bodies. Inner combustor shell 10 is bolted to TOBI 12 via flexible flange 14 at flange joint 16. As previously discussed, the difference in mass can drive different rates in thermal response (i.e., thermal growth and contraction) from each component during transient events, such as acceleration and deceleration. Flexible flange 14 provides compliance, allowing inner combustor shell 10 to expand and contract at a faster rate than TOBI 12 while minimizing the load applied to fasteners 22 and wear at the interface between flexible flange 14 and TOBI 12, thereby increasing component life. Inner combustor shell 10, including flexible flange 14, can be formed of any suitable material for operation in a gas turbine engine including, for example, nickel-based alloys suitable for hot section operation.

Inner combustor shell 10 including flexible flange 14 is an annular body. Flexible flange 14 can extend radially inward from an axial aft end of inner combustor shell 10. Flexible flange 14 can be spaced axially forward of an axial aftmost end of inner combustor shell 10 as shown in FIG. 1. Fastener 22 can be received through a hole in TOBI 12 and hole 20 in flexible flange 14. Fastener 22 can be retained by retaining nut 24 as known in the art. Fastener flange 18 can have thickness t1 measured in an axial direction that is greater than a thickness t2, also measured in an axial direction, of outer rail 26 (and/or radial connection members 40). The increased thickness t1 of fastener flange 18 can provide increased stiffness at flange joint 16. As illustrated in FIG. 1, fastener flange 18 is radially separated from outer rail 26 by a gap, such that there is no direct radial connection between fastener flange 18 and outer rail 26 and inner combustor shell 10.

FIG. 2 shows a front view of flexible flange 14. Flexible flange 14 can include a plurality of fastener flanges 18 spaced circumferentially about an inner diameter of flexible flange 14. Fastener flanges 18 can be uniformly distributed. Adjacent fastener flanges 18 can be joined by flexible arms 42. Fastener flanges 18 can project radially inward from flexible arms 42, as illustrated in FIGS. 2-4. In other embodiments, fastener flanges 18 may project radially outward from flexible arms 42. The position of fastener flanges 18 can be selected based on the location of flange joint 16. As discussed further herein, the location and configuration of flexible arms 42 relative to fastener flanges 18 can be selected to provide a desired compliance for flexible flange 14.

An annular outer rail 26 can extend radially inward from a radial inner surface of inner combustor shell 10. Outer rail 26 can provide an interface surface with a sealing element (not shown) disposed between flexible flange 14 and TOBI 12. In some embodiments, outer rail 26 may be omitted.

Fastener flanges 18 are indirectly connected to inner combustor shell 10 by flexible arms 42. Flexible arms 42 can be joined to outer rail 26 (or inner combustor shell 10) by radial connection members 40. Radial connection members 40 can extend radially inward from outer rail 26 (or directly from inner combustor shell 10) to flexible arms 42. Radial connection members 40 can be joined to outer rail 26 (or inner combustor shell 10) by fillets 44A. Radial connection members 40 can be joined to flexible arms 42 by fillets 44B. It will be understood by one of ordinary skill in the art that all transitions between components (e.g., radial connection members 40, flexible arms 42, outer rail 26, inner combustor shell 10, and fastener flanges 18) can be filleted to lower stress.

Radial connection members 40 are spaced circumferentially about flexible flange 14. Radial connection members 40 can be uniformly distributed. Radial connection members 40 are circumferentially offset from fastener flanges 18 to reduce the load applied to fasteners 22 with thermal response. Radial connection members 40 can be uniformly spaced between adjacent fastener flanges 18. As shown in FIG. 2, a radial connection member 40 can be disposed between each pair of adjacent fastener flanges 18 with each fastener flange 18 equidistant to the radial connection member 40. In other embodiments, more than one radial connection member 40 may be disposed between adjacent fastener flanges 18 or radial connection members 40 can be spaced such that no radial connection members 40 are disposed between some pairs of adjacent fastener flanges 18. For example, every other radial connection member 40 shown in FIG. 2 may be omitted.

Radial connection members 40 are configured to provide an indirect connection between fastener flanges 18 and outer rail 26 (or inner combustor shell 10). Radial connection members 40 can have a radial height h1 extending between outer rail 26 (or inner combustor shell 10) and flexible arms 42 selected to locate flexible arms 42 relative to outer rail 26 (or inner combustor shell 10) to provide a desired compliance as discussed further herein. Radial connection members 40 can further be configured to provide a stiffness to flexible flange 14 to accommodate a surge event in which a reverse fluid flow applies a forward directed axial force to flexible flange 14. Radial connection members 40 can have a thickness equal to a thickness t2 of outer rail 26 and a circumferential length L1 that is greater than thickness t2 to provide sufficient stiffness. In other words, the aspect ratio (L1/t2) of radial connection members 40 is greater than 1. In some embodiments, length L1 can be, for example, 0.5 inches (1.27 cm) and thickness t2 can be, for example, 0.1 inches (0.254 cm). As illustrated in FIGS. 2 and 3, the length L1 of radial connection members 40 can be uniform between filleted connections to outer rail 26 and flexible arms 42. In some embodiments, the length L1 of radial connection members 40 may vary in the radial direction between outer rail 26 and flexible arms 42 and/or radial connection members 40 may be angled relative to a radial plane.

Flexible arms 42 extend circumferentially a length L2 from each fastener flange 18 to a radial connection member 40 or another fastener flange 18 in the absence of a radial connection member 40 between adjacent fastener flanges 18. Length L2 of flexible arms 42 can be greater than length L1 of radial connection members 40. Flexible arms 42 extend from each circumferential side of fastener flange 18. Fastener flanges 18 can be joined to flexible arms 42 by fillets. For example, fastener flanges 18 can be joined to a radially inner side of flexible arms 42 by fillets 44C and 44D disposed on either side of each fastener flange 18 as shown in FIG. 3. As discussed further herein, flexible arms 42 can have an axial thickness 13 that is greater than the axial thickness t1 of fastener flanges 18, such that circumferential ends of flexible arms 42 extend axially outward from fastener flanges 18. Fastener flanges 18 can be joined to circumferential ends of flexible arms 42 by flanges 44E and 44F as shown in FIG. 4.

Flexible arms 42 are configured to flex in a radial direction during transient thermal events and with thermal growth of inner combustor shell 10 relative to TOBI 12. In this manner, flexible arms 42 reduce the radial stiffness of flexible flange 14 and reduce the load applied to fasteners 22 as compared to prior art designs in which a direct radial connection between fastener flanges 18 and inner combustor shell 10 is provided. As illustrated in FIG. 4, flexible arms 42 have an axial thickness 13 and radial height h2 with an aspect ratio (t3/h2) greater than 1. In other words, the axial thickness t3 is greater than the radial height h2. This aspect ratio provides radial compliance during transient thermal events to accommodate thermal growth of inner combustor shell 10 relative to TOBI 12, while providing sufficient stiffness to accommodate surge events in which a reverse fluid flow exerts a forward directed axial force on flexible flange 14. In some embodiments, axial thickness 13 can be, for example, 0.3 inches (0.762 cm) and radial height h2 can be, for example, 0.1 inches (0.254 cm).

Flexible arms 42 can have a rectangular cross-sectional shape as shown in FIG. 4. Tapered corners can be provided at a radially outer surface and/or a radially inner surface to accommodate tooling used to attach flexible flange 14 or other components and/or provide clearance for other components including, for example, fasteners, etc. In alternative embodiments, flexible arms 42 can have a rectangular cross-sectional shape with sharp corners or radiused corners or can have an oval cross-sectional shape. While the shape of flexible arms 42 can be modified to accommodate installation requirements, in all embodiments, the axial thickness t3 is greater than the radial height h2.

Flexible arms 42 can extend parallel to outer rail 26 (or inner combustor shell 10) as shown in FIG. 2 such that a radial height of gaps formed between flexible arms 42 and outer rail 26 (or inner combustor shell 10) is substantially uniform about flexible flange 14. In this configuration, flexible arms 42 collectively form an annular body disposed concentric with outer rail 26 and inner combustor shell 10. During transient thermal events, flexible arms 42 can flex in a radial direction along length L2 with thermal growth or contraction of inner combustor shell 10 and flexible flange 14.

In some embodiments, flexible arms 42 can be angled radially outward from fastener flanges 18 toward inner combustor shell 10. Flexible arms 42 can extend from fastener flanges 18 by an angle 0 equal to +/−30 degrees measured from a radially top center location of hole 20 to provide a compliance and stiffness needed for accommodating transient thermal events and surge events.

Figure 5:
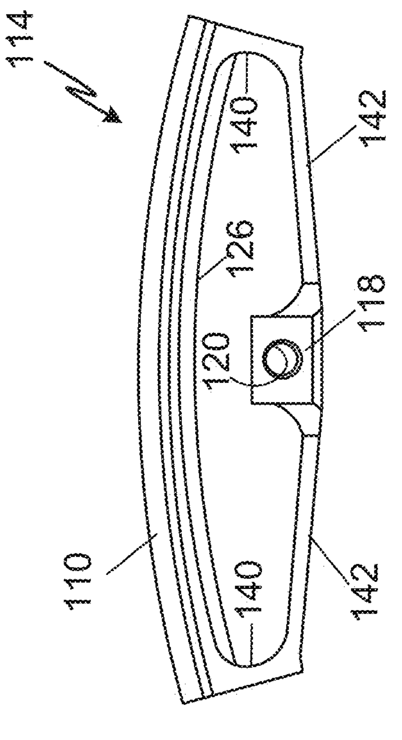
FIG. 5 is a front view of a portion of another embodiment of a flexible flange.

FIGS. 5-8 illustrate front views of portions of alternative embodiments of a flexible flange for an inner combustor shell. The modifications shown in FIGS. 5-8 can be provided, for example, to prevent blockage of airways that feed TOBI 12 or to provide clearance for other components and/or access for tooling, fasteners, etc. used in installation of adjacent components. FIG. 5 shows a portion of inner combustor shell 110 with flexible flange 114 having fastener flange 118, fastener hole 120, outer rail 126, radial connection members 140, and flexible arms 142. Flexible flange 114 can be substantially similar to flexible flange 14 with the exception that flexible arms 142 extend from a radially inner position of fastener flange 118 such that fastener flange 118 is disposed between flexible arms 142 and inner combustor shell 110 with a gap radially separating fastener flanges 118 from inner combustor shell 110. Flexible arms 142 can have an aspect ratio as described with respect to flexible arms 142 to promote flex in a radial direction during transient thermal events. Flexible arms 142 can be connected to outer rail 126 via radial connection members 140. Radial connection members 140 can be arranged circumferentially as shown in FIG. 2 for flexible flange 14 and provided between each pair of adjacent fastener flanges 18. In contrast to flexible arms 42, flexible arms 142 are not curved and do not extend parallel to inner combustor shell 10 but extend linearly from fastener flange 118 to radial connection members 140. The gap between flexible arms 142 and inner combustor shell 110 varies in size with the angling of flexible arms 142. As illustrated in FIG. 5, the radial height of a gap formed between flexible arms 142 and inner combustor shell 110 is greatest in the region of fastener flange 118 and is reduced with the circumferential extent of flexible arms 142 away from fastener flange 118.

Figure 6:
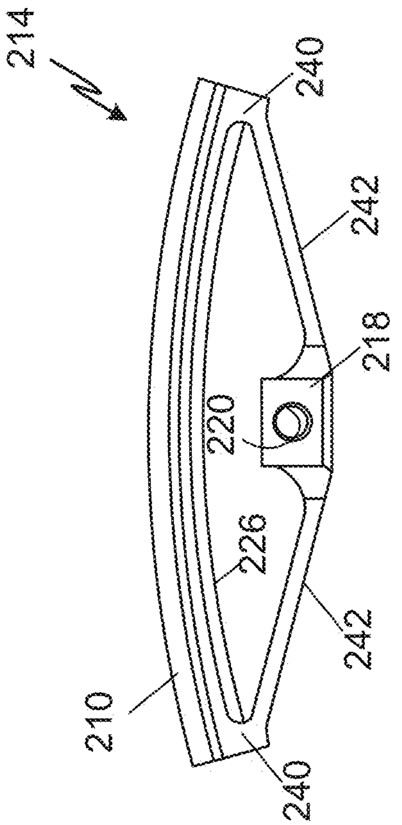
FIG. 6 is a front view of a portion of yet another embodiment of a flexible flange.

FIG. 6 shows a portion of inner combustor shell 210 with flexible flange 214 having fastener flange 218, fastener hole 220, outer rail 226, radial connection members 240, and flexible arms 242. Flexible flange 214 is substantially similar to flexible flange 114 with flexible arms 242 extending from a radially inner position of fastener flange 218 such that fastener flange 218 is disposed between flexible arms 242 and inner combustor shell 210 with a gap radially separating fastener flanges 218 from inner combustor shell 210. In contrast to flexible flange 114, radial connection members 240 can have a reduced radial height as compared to radial connection members 140, such that flexible arms 242 are angled radially outward from fastener flange 218 toward inner combustor shell 210 to a greater degree than flexible arms 142. Similar to fastener flange 118, the gap between flexible arms 242 and inner combustor shell 210 varies in size with the angling of flexible arms 242 with the gap formed between flexible arms 242 and inner combustor shell greatest in the region of fastener flange 218.

Figure 7:
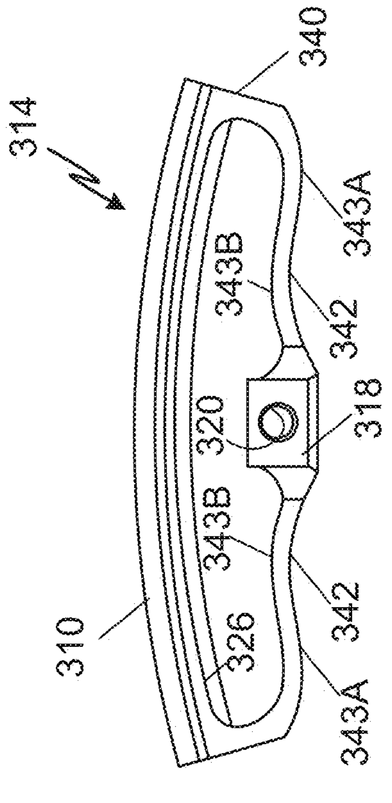
FIG. 7 is a front view of a portion of yet another embodiment of a flexible flange.

FIG. 7 shows a portion of inner combustor shell 310 with flexible flange 314 having fastener flange 318, fastener hole 320, outer rail 326, radial connection members 340, flexible arms 342, and bend 343. Flexible flange 314 is substantially similar to flexible flange 114 with the exception that flexible arms 342 can have a circumferential length that is greater than the circumferential length of flexible arms 142 with one or more bends 343A, 343B. Flexible arm 342 can bow radially inward at bend 343A as shown in FIG. 7. Flexible arm 342 can bow radially outward at bend 343B as shown in FIG. 7. The increased length of flexible arms 342 can provide increased compliance to flexible flange 314 during transient thermal events.

Figure 8:
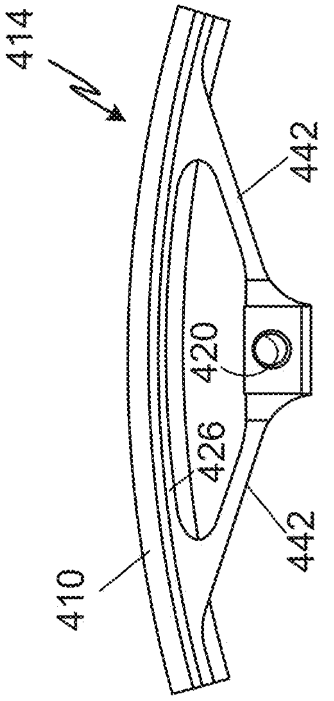
FIG. 8 is a front view of a portion of yet another embodiment of a flexible flange.

FIG. 8 shows a portion of inner combustor shell 410 with flexible flange 414 having fastener flange 418, fastener hole 420, outer rail 426, and flexible arms 442. Flexible flange 414 is similar to flexible flange 214 of FIG. 6 with the exception that flexible arms 442 extend from a radially outer position of fastener flange 418 and join directly to outer rail 426. Flexible flange 414 does not include radial connection members.

The disclosed flexible flanges can be provided on inner combustor shells or other low mass components configured to be joined to large mass components that exhibit comparatively slower thermal response in transient thermal events. The disclosed flexible flanges can reduce wear and joint stress at a joint location. The disclosed flexible flanges reduce a radial stiffness connection between the flange joint and the inner combustor shell thereby reducing wear and load on a fastener (i.e., bolt) due to thermal growth mismatch. The disclosed flexible flanges have the thermal compliance needed to accommodate transient events while providing stiffness needed, for example, to accommodate surge events, during which reverse fluid flow pushes the flexible flange forward.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

An annular flexible flange is provided for connecting components of a gas turbine engine having different rates of thermal response to transient thermal events. The annular flexible flange is disposed about an axis and extends radially from an annular body and incudes a plurality of fastener flanges spaced circumferentially about the flexible flange and a plurality of flexible arms configured to flex in a radial direction. The plurality of fastener flanges are separated from the annular body by a radial gap. The plurality of flexible arms are connected to the annular body and connected to the plurality of fastener flanges.

The annular flexible flange of the preceding paragraph can optionally include, additionally and/or alternatively, any one or more of the following features, configurations, and/or additional components:

In an embodiment of the annular flexible flange of the preceding paragraphs, the plurality of flexible arms can extend in a circumferential direction between adjacent fastener flanges of the plurality of fastener flanges.

In an embodiment of the annular flexible flange of any of the preceding paragraphs, the plurality of flexible arms have an axial thickness and a radial height, wherein the axial thickness can be greater than the radial height.

In an embodiment of the annular flexible flange of any of the preceding paragraphs, the plurality of fastener flanges can extend radially inward from the plurality of flexible arms.

An embodiment of the annular flexible flange of any of the preceding paragraphs can further include a plurality of connection members connecting the plurality of flexible arms to the annular body or to an annular rail extending radially inward from the annular body.

In an embodiment of the annular flexible flange of any of the preceding paragraphs, the plurality of connection members can be spaced circumferentially about the flexible flange and are radially offset from the plurality of fastener flanges.

In an embodiment of the annular flexible flange of any of the preceding paragraphs, each connection member of the plurality of connection members can be disposed between a pair of adjacent fastener flanges of the plurality of fastener flanges.

In an embodiment of the annular flexible flange of any of the preceding paragraphs, each connection member of the plurality of connection members can have a circumferential length and an axial thickness, wherein the circumferential length is greater than the axial thickness.

In an embodiment of the annular flexible flange of any of the preceding paragraphs, a circumferential length of each flexible arm of the plurality of flexible arms can be greater than a circumferential length of each connection member of the plurality of connection members.

In an embodiment of the annular flexible flange of any of the preceding paragraphs, the plurality of flexible arms can extend parallel to the annular body.

An inner combustor shell of a gas turbine engine is configured to be connected to a component having a comparatively slower thermal response to a transient thermal event and includes an annular body defining a combustion chamber and an annular flexible flange extending radially from an annular body. The inner combustor shell is disposed about an axis. The annular flexible flange includes a plurality of fastener flanges spaced circumferentially about the flexible flange and a plurality of flexible arms configured to flex in a radial direction. The plurality of fastener flanges are separated from the annular body by a radial gap. The plurality of flexible arms are connected to the annular body and connected to the plurality of fastener flanges.

The inner combustor shell of the preceding paragraph can optionally include, additionally and/or alternatively, any one or more of the following features, configurations, and/or additional components:

In an embodiment of the inner combustor shell of the preceding paragraphs, the plurality of flexible arms can extend in a circumferential direction between adjacent fastener flanges of the plurality of fastener flanges.

In an embodiment of the inner combustor shell of any of the preceding paragraphs, the plurality of flexible arms have an axial thickness and a radial height, wherein the axial thickness can be greater than the radial height.

In an embodiment of the inner combustor shell of any of the preceding paragraphs, the plurality of fastener flanges can extend radially inward from the plurality of flexible arms.

An embodiment of the inner combustor shell of any of the preceding paragraphs can further include a plurality of connection members connecting the plurality of flexible arms to the annular body or to an annular rail extending radially inward from the annular body.

In an embodiment of the inner combustor shell of any of the preceding paragraphs, the plurality of connection members can be spaced circumferentially about the flexible flange and are radially offset from the plurality of fastener flanges.

In an embodiment of the inner combustor shell of any of the preceding paragraphs, each connection member of the plurality of connection members can be disposed between a pair of adjacent fastener flanges of the plurality of fastener flanges.

In an embodiment of the inner combustor shell of any of the preceding paragraphs, each connection member of the plurality of connection members has a circumferential length and an axial thickness, wherein the circumferential length can be greater than the axial thickness.

In an embodiment of the inner combustor shell of any of the preceding paragraphs, a circumferential length of each flexible arm of the plurality of flexible arms can be greater than a circumferential length of each connection member of the plurality of connection members.

In an embodiment of the inner combustor shell of any of the preceding paragraphs, the plurality of flexible arms can extend parallel to the annular body.

The invention claimed is:

1. An annular flexible flange for connecting components of a gas turbine engine having different rates of thermal response to transient thermal events, the annular flexible flange disposed about an axis and extending radially from an annular body, the annular flexible flange comprising:

a plurality of fastener flanges spaced circumferentially about the flexible flange, wherein each of the plurality of fastener flanges is separated from the annular body by a respective radial gap; and a plurality of flexible arms configured to flex in a radial direction, the plurality of flexible arms extending in a circumferential direction between adjacent fastener flanges of the plurality of fastener flanges, the plurality of flexible arms each having a first end connected to the annular body and a second end connected to a corresponding one of the plurality of fastener flanges, wherein each of the plurality of fastener flanges is disposed between and connected to adjacent ones of the plurality of flexible arms, each of the plurality of fastener flanges having a first circumferential end connected to the second end of a first of the respective adjacent flexible arms, and each of the plurality of fastener flanges having a second circumferential end connected to the second end of a second of the respective adjacent flexible arms, and wherein each of the plurality of flexible arms has an axial thickness and a radial height, wherein the axial thickness is greater than the radial height.

2. The flexible flange of claim 1, wherein the plurality of fastener flanges extends radially inward from the plurality of flexible arms.

3. The flexible flange of claim 1, and further comprising a plurality of connection members connecting the first ends of the plurality of flexible arms to the annular body or to an annular rail extending radially inward from the annular body, wherein the plurality of fastener flanges are disposed radially inward of the annular body or annular rail.

4. The flexible flange of claim 3, wherein the plurality of connection members are spaced circumferentially about the flexible flange and are radially offset from the plurality of fastener flanges.

5. The flexible flange of claim 4, wherein each of the plurality of connection members is disposed between a respective pair of adjacent fastener flanges of the plurality of fastener flanges.

6. The flexible flange of claim 4, wherein each of the plurality of connection members has a circumferential length and an axial thickness, wherein the circumferential length is greater than the axial thickness.

7. The flexible flange of claim 3, wherein a circumferential length of each of the plurality of flexible arms is greater than a circumferential length of each of the plurality of connection members.

8. The flexible flange of claim 1, wherein the plurality of flexible arms extend parallel to the annular body.

9. An inner combustor shell of a gas turbine engine, the inner combustor shell configured to be connected to a component having a comparatively slower thermal response to a transient thermal event, the inner combustor shell disposed about an axis and comprising:

an annular body defining at least a portion of a combustion chamber; and an annular flexible flange extending radially from the annular body, the annular flexible flange comprising:

a plurality of fastener flanges spaced circumferentially about the flexible flange, wherein each of the plurality of fastener flanges is separated from the annular body by a respective radial gap; and a plurality of flexible arms configured to flex in a radial direction, each of the plurality of flexible arms extending in a circumferential direction between adjacent ones of the plurality of fastener flanges, each of the plurality of flexible arms having a first end connected to the annular body and a second end connected to a corresponding one of the plurality of fastener flanges;

wherein each of the plurality of fastener flanges is disposed between and connected to adjacent ones of the plurality of flexible arms, with each of the plurality of fastener flanges having a first circumferential end connected to the second end of a first of the respective adjacent flexible arms, and each of the plurality of fastener flanges having a second circumferential end connected to the second end of a second of the respective adjacent flexible arms, and wherein each of the plurality of flexible arms has an axial thickness and a radial height, wherein the axial thickness is greater than the radial height.

10. The inner combustor shell of claim 9, wherein the plurality of fastener flanges extend radially inward from the plurality of flexible arms.

11. The inner combustor shell of claim 9 and further comprising a plurality of connection members connecting the first ends of the plurality of flexible arms to the annular body or to an annular rail extending radially inward from the annular body, wherein the plurality of fastener flanges are disposed radially inward of the annular body or annular rail.

12. The inner combustor shell of claim 11, wherein the plurality of connection members are spaced circumferentially about the flexible flange and are radially offset from the plurality of fastener flanges.

13. The inner combustor shell of claim 12, wherein each of the plurality of connection members is disposed between a respective pair of adjacent fastener flanges of the plurality of fastener flanges.

14. The inner combustor shell of claim 12, wherein each connection member of the plurality of connection members has a circumferential length and an axial thickness, wherein the circumferential length is greater than the axial thickness.

15. The inner combustor shell of claim 11, wherein a circumferential length of each flexible arm of the plurality of flexible arms is greater than a circumferential length of each connection member of the plurality of connection members.

16. The inner combustor shell of claim 9, wherein the plurality of flexible arms extend parallel to the annular body.

* * * * *